No. 744,634. PATENTED NOV. 17, 1903.
F. A. SILVIS.
HOSE COUPLING.
APPLICATION FILED MAY 22, 1903.
NO MODEL.

Witnesses:
R. H. Butler.
E. E. Potter.

Inventor
Frank A. Silvis,
By H. C. Evert & Co.
Attorneys.

No. 744,634. Patented November 17, 1903.

UNITED STATES PATENT OFFICE.

FRANK A. SILVIS, OF MILLVALE STATION, PENNSYLVANIA.

HOSE-COUPLING.

SPECIFICATION forming part of Letters Patent No. 744,634, dated November 17, 1903.

Application filed May 22, 1903. Serial No. 158,332. (No model.)

*To all whom it may concern:*

Be it known that I, FRANK A. SILVIS, a citizen of the United States of America, residing at Millvale Station, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplers, and has for its object the provision of novel means whereby two sections of a hose may be easily, quickly, and effectually connected together.

Another object of my invention is the provision of a novel hose-coupler which may be readily connected together without the use of screw-threads, now generally used.

A still further object of my invention is the construction of a hose-coupler which will be comparatively inexpensive to manufacture, strong, durable, and highly efficient in use.

Briefly described, my improved hose-coupler comprises a male and female member, the male member of which may be hinged to the female member, and upon the male member I provide means for locking the two sections together when the same have been coupled.

In describing the invention in detail reference is had to the accompanying drawings, forming a part of this specification, and wherein like numerals of reference indicate like parts throughout the several views, in which—

Figure 1:
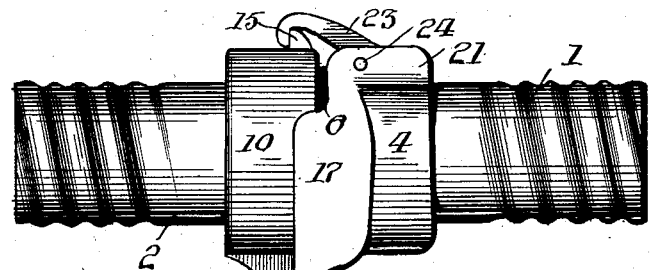
Figure 2:
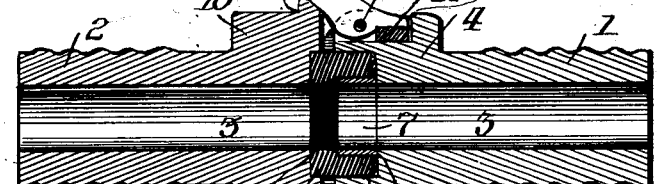
Figure 3:
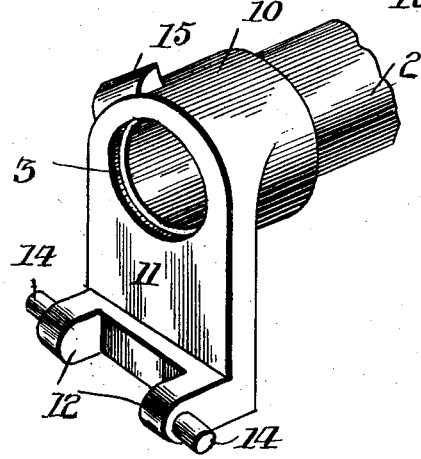

Figure 1 is a side elevation of my improved hose-coupler, showing the two sections connected together. Fig. 2 is a longitudinal sectional view of the same. Fig. 3 is a perspective view of the female member, and Fig. 4 is a perspective view of the male member.

To put my invention into practice, I provide a male and female member 1 and 2, each of said members having an aperture 3 formed longitudinally thereof, the apertures in said sections adapted to lie in alinement when the two sections are coupled together. The male member has formed on its one end the enlarged annular collar 4, which has formed therein the recess 5, carrying a rubber gasket 6. This gasket is secured in the annular recess 5 by means of a metallic ring 7, which abuts against the shoulders 8, formed by the rear face of the recess 5. The rubber gasket 6 is adapted to extend a short distance out of said recess and when the two sections are coupled together is adapted to seat in a small annular recess 9, formed in the enlarged annular collar 10 of the female section 2. Formed integral with the enlarged annular collar 10 is the downwardly-extending portion 11, carrying the outwardly-extending lugs 12, said lugs carrying pins 14. These pins are formed integral with the lugs and extend outwardly at right angles to the same. Upon the top of the annular collar 10 is secured or formed integral therewith the lug 15, the object of which will be hereinafter described. The downwardly-extending portion 11 of this enlarged collar may be braced in any suitable manner, and in Figs. 1 and 2 of the drawings I have shown a brace or wing 16, which supports the downwardly-extending portion 11, as may be readily seen from the above-mentioned figures.

Figure 4:
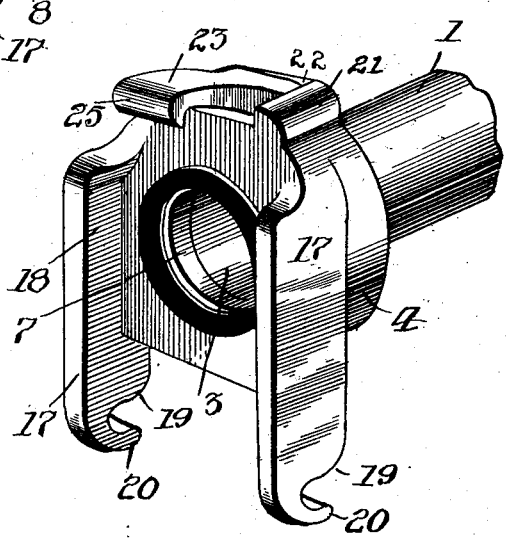

The enlarged collar 4 of the male section 1 carries the downwardly-extending portions 17, which are formed integral therewith and project beyond the annular collar 4, as illustrated in Fig. 4 of the drawings and indicated by reference-numeral 18. These downwardly-extending portions 17 have their lower ends cut away, as indicated at 19, forming hooks 20. Upon the top of the said annular collar 4 is formed the enlarged portion 21, which is cut away, as indicated at 22, to receive the pawl or dog 23, which is journaled in the enlarged portion 21 by means of the pin 24. This pawl or dog has its outer end shaped to conform to a hook, as indicated at 25, while the other end of said pawl or dog extends within the recess 22 and seated in said recess. Beneath this extended end is a piece of rubber 26.

The male and female sections 1 and 2 have their exterior periphery knurled or grooved, as illustrated in Figs. 1 and 2 of the drawings, whereby the hose-sections may be secured thereto by any desired means.

The manner of coupling my improved hose-coupler is as follows: The male section or member 1, carrying the downwardly-extending portion 17, having hooks formed on their lower end, is engaged to the female member 2 by securing the hooks 20 over the outwardly-extending pins 14 of the female section, as illustrated in Fig. 1 of the drawings, when the two sections may be drawn together, the pawl 23 engaging over the lug 15, formed on the female member, said lug being normally held in position by means of the expansion of the piece of rubber which is carried in the recess 22. This piece of rubber is depressed when the pawl 23 rides up the inclined surface of the lug 15 and expands when the hook 25 has engaged behind the lug carried upon the female member 2. The rubber gasket or washer 7 will be seated in the small recess 9, formed in the female section, said rubber gasket being slightly depressed when the connection is made, whereby a tight and non-leakable coupling is insured.

A particular feature of my invention to which I wish to call attention is that the coupling may be readily coupled when the pressure is on, and by means of the manner of joining said coupling together and locking the same in position this may be accomplished easily and effectually.

While I have herein shown and described my improved hose-coupler of the above construction, it is obvious that various changes may be made in the details of construction without departing from the general spirit of the invention.

Having fully described my invention, what I claim as new, and desire to secure by Letters Patent, is—

1. A hose-coupler comprising a male and a female section, each of said sections having an aperture formed longitudinally therein, an enlarged collar formed on the male section, a recess formed within said collar, a rubber gasket adapted to be secured within said recess, downwardly-extending portions having hooks formed on their lower ends, an enlarged collar formed upon the female section, a recess formed in said collar and adapted to receive the rubber gasket carried by the male member, a downwardly-extending portion formed integral with said collar, outwardly-extending pins carried by the downwardly-extending portion and adapted to be engaged in the hooks carried by the male member, and means for locking the two sections together, substantially as described.

2. A hose-coupler comprising a male and a female member, said male member and female member having an aperture formed longitudinally therein, an enlarged collar formed on said male member, an annular recess formed in said collar, a rubber gasket adapted to be secured therein, a metallic ring supporting and securing said gasket within the recess, downwardly-extending portions formed integral with the collar carried by the male member, hooks formed on the lower end of said downwardly-extending portion, an enlarged collar formed upon the female section or member, a recess formed in said section and adapted to receive the rubber gasket carried by the male member, downwardly-extending portions formed integral with said collar, outwardly-extending pins carried by the downwardly-extending portion, said pins adapted to be engaged by the hooks carried by the male member, and means for locking the two members together, substantially as described.

3. A hose-coupler comprising a male and a female member, said male and female members having apertures formed longitudinally therein, an enlarged collar formed on the male member, an annular recess formed in said collar, a rubber gasket adapted to be secured therein, a metallic ring supporting and securing said gasket within the recess, downwardly-extending portions formed integral with the male member, hooks formed on the lower ends of said downwardly-extending portions, an enlarged collar formed upon the female section, a recess formed in said section and adapted to receive a rubber gasket carried by the male member, downwardly-extending portions formed integral with said collar, outwardly-extending pins carried by the downwardly-extending portion, a lug formed on the top of said enlarged collar, a pawl or dog pivotally secured within a recess formed in the top of the enlarged collar carried by the male member, means whereby when the two sections or members are locked together, said pawl or dog will be held normally in a locked position, substantially as described.

In testimony whereof I affix my signature in the presence of two witnesses.

FRANK A. SILVIS.

Witnesses:
E. E. POTTER,
K. H. BUTLER.